(12) United States Patent
Cropp et al.

(10) Patent No.: US 11,637,850 B2
(45) Date of Patent: Apr. 25, 2023

(54) MITIGATING SECURITY RISKS ASSOCIATED WITH UNSECURED WEBSITES AND NETWORKS

(71) Applicant: Microsoft Technology Licensing, LLC, Redmond, WA (US)

(72) Inventors: Ryan G. Cropp, Seattle, WA (US); Felix Andrew, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 713 days.

(21) Appl. No.: 16/428,570

(22) Filed: May 31, 2019

(65) Prior Publication Data
US 2020/0382545 A1 Dec. 3, 2020

(51) Int. Cl.
*H04L 9/40* (2022.01)
*G06F 9/54* (2006.01)
*H04W 12/02* (2009.01)

(52) U.S. Cl.
CPC ............ *H04L 63/1433* (2013.01); *G06F 9/54* (2013.01); *H04W 12/02* (2013.01)

(58) Field of Classification Search
CPC ....... H04L 63/1433; G06F 9/54; H04W 12/02
See application file for complete search history.

(56) References Cited

U.S. PATENT DOCUMENTS

| 9,338,137 | B1 * | 5/2016 | Fedko ................ H04W 76/12 |
| 9,826,018 | B1 | 11/2017 | Walfish |
| 10,148,688 | B1 * | 12/2018 | Shavell ............... H04W 12/121 |

(Continued)

FOREIGN PATENT DOCUMENTS

| CN | 1879071 A | 12/2006 |
| CN | 201674527 U | 12/2010 |

(Continued)

OTHER PUBLICATIONS

Khan, N., Abdullah, J., & Khan, A. S. (Aug. 2015). Towards vulnerability prevention model for web browser using interceptor approach. In 2015 9th International Conference on IT in Asia (CITA) (pp. 1-5). IEEE. (Year: 2015).*

(Continued)

*Primary Examiner* — Chau Le
(74) *Attorney, Agent, or Firm* — Weaver IP L.L.C.

(57) ABSTRACT

Security mitigation techniques are presented to protect a user device or a user thereof from attackers, especially in instances when they are most at risk. In an example embodiment, one or more mitigation actions may be performed when it is determined that a website is unsecured and a network with which the user device is connected is open Wi-Fi. The mitigation action may include generating a visual warning in a graphical user interface (GUI) of a web browser that is displaying the website, preventing the transmission of sensitive information, halting execution of scripts and resources of inactive web browser tabs or when there is a change in network connection, or not allowing execution of scripts or resources when the website is unsecured. In another example embodiment, transmission of sensitive information is prevented from being transmitted by an application over an open Wi-Fi network.

20 Claims, 7 Drawing Sheets

(56) References Cited

U.S. PATENT DOCUMENTS

| | | | |
|---|---|---|---|
| 2013/0086254 A1 | 4/2013 | Bhola et al. | |
| 2013/0347073 A1 | 12/2013 | Bryksa et al. | |
| 2018/0152976 A1* | 5/2018 | Baron | H04W 12/02 |
| 2019/0081981 A1* | 3/2019 | Bansal | H04L 63/1433 |
| 2020/0201962 A1* | 6/2020 | Brannon | G06F 11/3438 |
| 2020/0213344 A1* | 7/2020 | Sivagnanam | H04L 63/20 |

FOREIGN PATENT DOCUMENTS

| | | |
|---|---|---|
| CN | 104580155 A | 4/2015 |
| CN | 106209918 A | 12/2016 |

OTHER PUBLICATIONS

Singh, Y. (Nov. 2016). How to detect browser window is active or not—javascript. Makitweb. Retrieved Jan. 15, 2022, from https://web.archive.org/web/20161106032725/https://makitweb.com/how-to-detect-browser-window-active-or-not-javascript/ (Year: 2016).*

"HTTPs is Easy !", Retrieved From: https://www.youtube.com/watch?v=_BNlkw4Ao9w, Jul. 12, 2018, 1 Page.

Hunt, Troy, "Here's Why Your Static Website Needs HTTPS", Retrieved From: https://www.troyhunt.com/heres-why-your-static-website-needs-https/, Jul. 13, 2018, 6 Pages.

"Auto Close Tab-Chrome Web Store", Retrieved from: https://chrome.google.com/webstore/detail/auto-close-tab/hknjefkfmlpbipmkkfhebdpphfmkpnjm?hl=en, Dec. 20, 2018, 1 Page.

"HTTPS Everywhere Electronic Frontier Foundation", Retrieved from: https://web.archive.org/web/20190530060805/https://www.eff.org/https-everywhere, May 30, 2019, 3 Pages.

"HTTPS Everywhere FAQ Electronic Frontier Foundation", Retrieved from: https://web.archive.org/web/20190513004828/https://www.eff.org/https-everywhere/faq#/why-is-https-everywhere-preventing-mefrom-joining-this-hotelschoolother-wireless-network, May 13, 2019, 9 Pages.

"Mixed Content Blocking in Firefox: Firefox Help", Retrieved from: https://web.archive.org/web/20190425041352/https://support.mozilla.org/en-us/kb/mixed-content-blocking-firefox, Apr. 25, 2019, 2 Pages.

"Tab Autoclose Timer—Chrome Web Store", Retrieved from: https://chrome.google.com/webstore/detail/tab-autoclose-timer/imihgjohpadebbpnoddkoafdkmlbojpn?hl=en, Jan. 9, 2017, 1 Page.

"Unsecured Wireless Network Pop-up Warning: Norton Community", Retrieved from: https://community.norton.com/en/forums/unsecured-wireless-network-pop-warning, retrieved on May 25, 2020, 14 Pages.

"International Search Report and Written Opinion Issued in PCT Application No. PCT/US20/029419", dated Jun. 4, 2020, 13 Pages.

"First Office Action and Search report Issued in Chinese Patent Application No. 202080038063.X", dated Feb. 12, 2023, 13 Pages.

* cited by examiner

MITIGATING SECURITY RISKS ASSOCIATED WITH UNSECURED WEBSITES AND NETWORKS

BACKGROUND

There are security concerns associated with browsing an unencrypted website via a home network. For example, an Internet service provider may inject unrelated advertising content into the unencrypted website. However, when the context is changed to an unsecured network, such as an open Wi-Fi network at a coffee shop or an airport, the security concerns increase. These security concerns may include eavesdropping, malware distribution, or the like. In addition, attackers may steal user information entered into an unencrypted website or inject content into the code of the unencrypted website, thereby manipulating the user web browsing experience.

Accordingly, the integrity of the device may be compromised when accessing an unencrypted website over an unsecured network, and the user may be unaware of the security risks. The user may also unknowingly create a security vulnerability when changing from a secure network (e.g., a work network) to an unsecured network (e.g., an open Wi-Fi network) by leaving web browser tabs open that are unused by the user, and thus the user may not notice a tab was left open that displays a website over the unsecured network Attackers may exploit this vulnerability to cause personal and financial harm to the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for mitigating risks associated with an unsecured communication with a website. A security mode of a Wi-Fi network with which a user device is connected is determined. A type of communication security for a website that a web browser of the user device is attempting to access over the Wi-Fi network is determined. In response to determining that the security mode is an open mode, and that the communication security type is secure, at least one action is performed to protect the user device from being compromised.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 5-9 each depicts a flowchart of a method for performing a mitigation action, according to an example embodiment.

Figure 10:
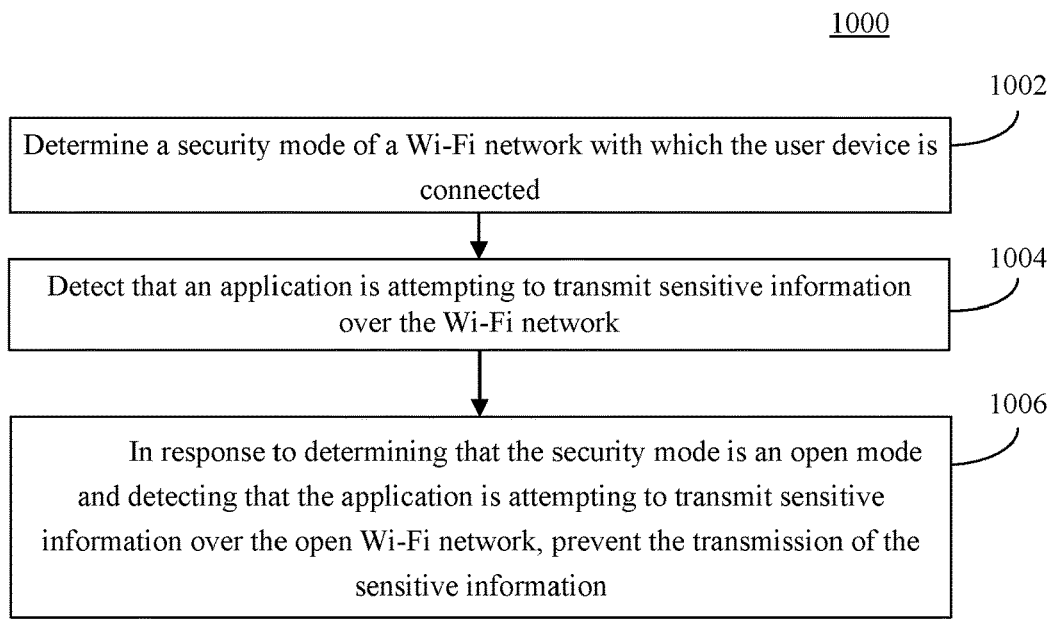

FIG. 10 depicts a flowchart of a method for mitigating security risks associated with an open network, according to an example embodiment.

Figure 11:
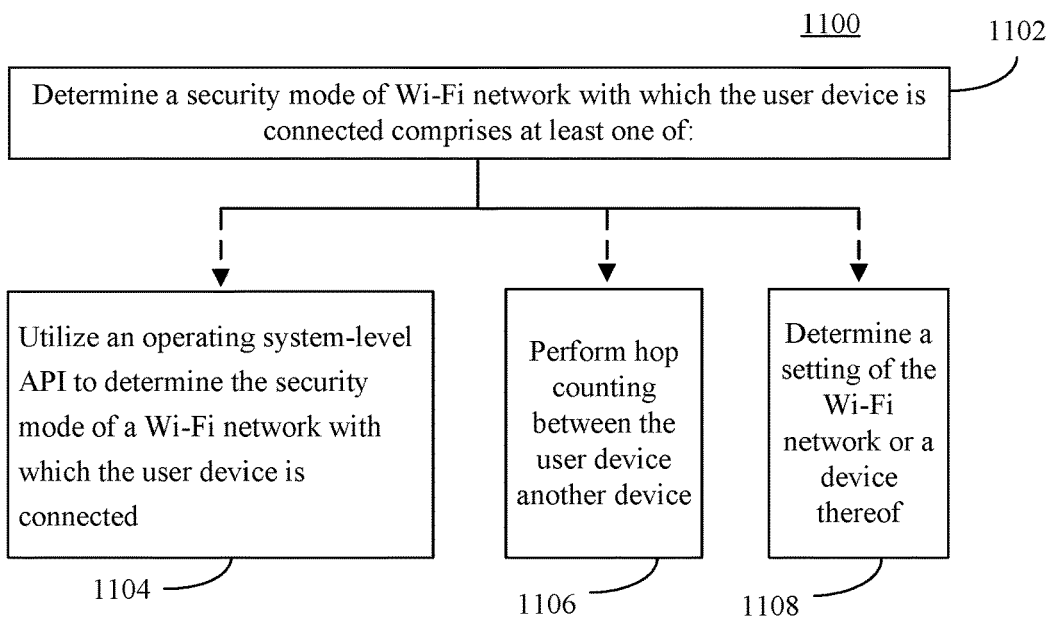

FIG. 11 depicts a flowchart of a method of determining a security mode of an open network, according to an example embodiment.

Figure 12:
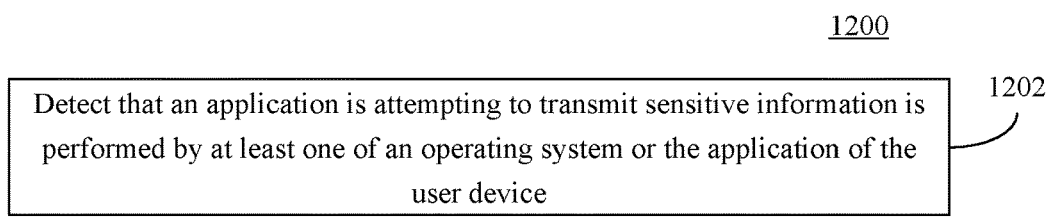

FIG. 12 depicts a flowchart of a method of preventing transmission of sensitive information over an open network, according to an example embodiment.

Figure 13:
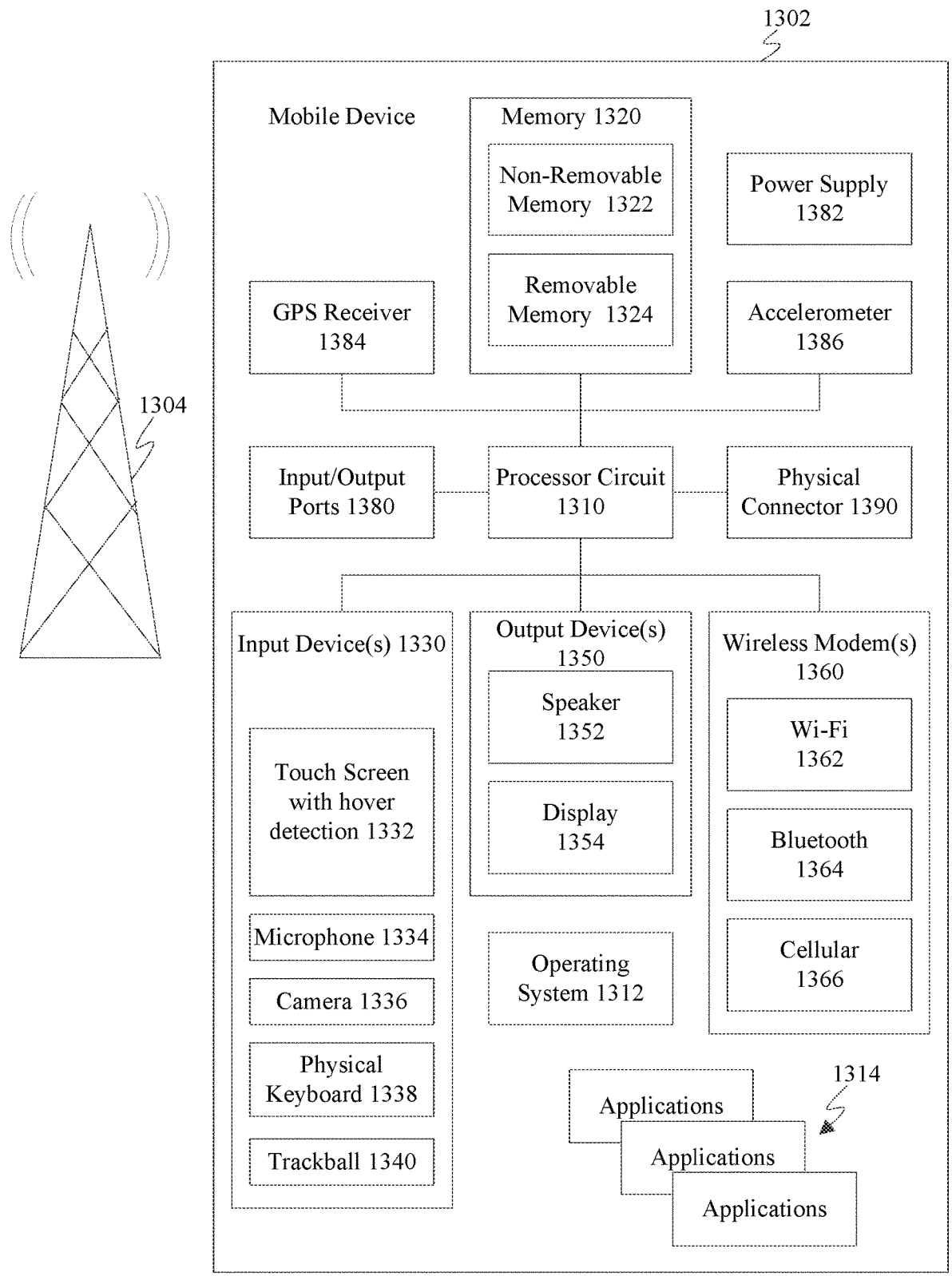

FIG. 13 is a block diagram of an example computer system in which embodiments may be implemented.

Figure 14:
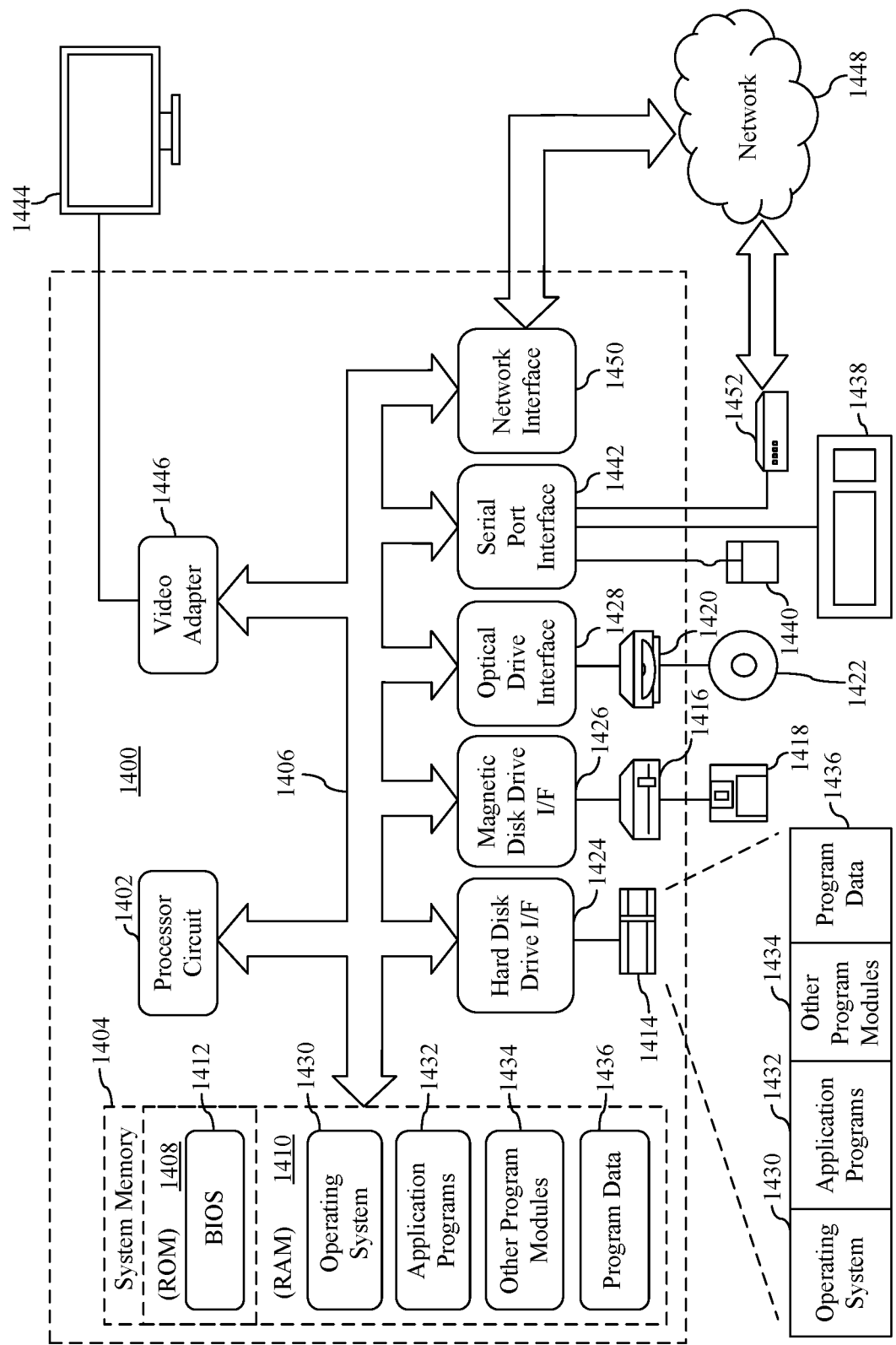

FIG. 14 is a block diagram of an example computer system in which embodiments may be implemented.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The example embodiments described herein are provided for illustrative purposes and are not limiting. The examples described herein may be adapted to any type of computing device, network, or application. Further structural and operational embodiments, including modifications/alterations, will become apparent to persons skilled in the relevant art(s) from the teachings herein.

Users may browse the World Wide Web via many networks, such as a work network, a home network, or an unsecured, public or open network. An open Wi-Fi network may be found in many public locations, including airports, coffee shops, restaurants, hotels or malls, and may allow users to access the Internet for free without requiring a password. The open Wi-Fi networks are so ubiquitous that users often connect to them without a second thought. However, there are many security risks associated with the open Wi-Fi network, whether the user is working, browsing the news, or accessing websites that require a login, like electronic mail (email) or banking. A first user on the open Wi-Fi network may easily eavesdrop on a second user on the same network. In such case, the second user may be subjected to a man-in-the-middle attack that includes viewing of data sent from computing device of the second user or data viewed by the second user, malware distribution, injecting content, capturing login credentials, or hijacking user accounts, etc.

Additionally, a website may be unencrypted, which presents its own set of security issues. While there is a trend to move toward secure websites, many websites remain unencrypted. Accessing an unsecured website on an open Wi-Fi network is a security concern because attackers may view and change content of the website. To exacerbate this issue, a user device's current Internet connection may be left out of sight for users who may be at risk when browsing an unsecured website on the open Wi-Fi network.

It is possible to determine whether a website is secure (https) or unsecured (http) and this communication security may be indicated via some form of iconography or font type treatment in an attempt to convey a level of risk in the address bar of a web browser. Alternatively, web browsers may mark an unsecured website as such, or indicate that personal information may be stolen. However, these approaches do not link unsecured or open network connection to the warnings in the web browsers.

Operating systems of computing devices may natively warn users about unsecured network connections, but do not convey the warning in the context of web browsing, when the user may be most at risk. Users may easily disregard the warning and continue at their own risk. In addition, if the computing devices are set to "auto connect," then this warning is often not presented to the users.

Moreover, security issues may occur when the network connection is changed, particularly from a secure network (e.g., work) to an unsecured network (e.g., open Wi-Fi). For example, a user may access multiple websites on a web browser at work on a private, secure network. The user may decide to leave the web browser open with multiple open tabs, then go to a coffee shop and resume working using an open Wi-Fi network. In this example, the user may create a security problem with the multiple open tabs, because the websites displayed on the open tabs may automatically load with execution of scripts and resources even though the network connection has changed to an unsecured network. The current notion of tab suspending does not consider the security effects or have any concept of the type of communication security for a website. In addition, when a tab is in the foreground, the user may see a lock icon associated with an encrypted website and an unlock icon associated with an unencrypted website. However, when the tab is in the background, the user simply cannot tell whether the web page on that background tab is secure.

Some current solutions to these security problems may focus on limiting user actions or providing restrictions on unencrypted websites without considering network connections. Other solutions may focus on suspending resources on a browser tab that is displaying a website without considering whether the website is encrypted.

In embodiments described herein, security mitigation techniques are presented to protect the user or the user device from attackers, especially in instances when they are most at risk. In an example embodiment, a security mode of the current network and a type of communication security for a website that is being accessed are automatically determined. One or more mitigation actions may be performed when it is determined that the website is unsecured and the network is open Wi-Fi. The mitigation action may include generating a visual warning in a graphical user interface (GUI) of a web browser, preventing the transmission of sensitive information, halting execution of scripts and resources of inactive tabs or when there is a change in network connection, or not allowing execution of scripts or resources when the website is unsecured. A web browser may be an application used for accessing information on the World Wide Web and may include web browsers such as Mozilla® Firefox™, Google™ Chrome™, Microsoft® Edge®, and Apple® Safari® and other client-side web applications. In another example embodiment, transmission of sensitive information is prevented from being transmitted by an application over an open Wi-Fi network.

Thus, the mitigation techniques described herein connect two distinct scenarios of an open Wi-Fi network and an unencrypted browser in the context of a web browser or an application, when the security issues are most relevant. The mitigation techniques relieve the user of the burden of actively remembering and managing the security mode of the current network or the type of communication security of websites on background tabs. Thus, the web browsing process is improved to provide a safer and less burdensome experience for the user. By improving the web browsing and data transmission process, the functioning of the user device and associated systems is also improved. For example, the user device may be more efficient and more secure. In other words, fewer computing resources (e.g., processor cycles, input/output, power) may be required than normal in performing the mitigation actions (e.g., suspending resources in connection with unsecured websites or network changes). The mitigation techniques may also improve security to the user device by enforcing strong security measure with respect to data transmission and protecting against usage vulnerabilities.

Figure 1:
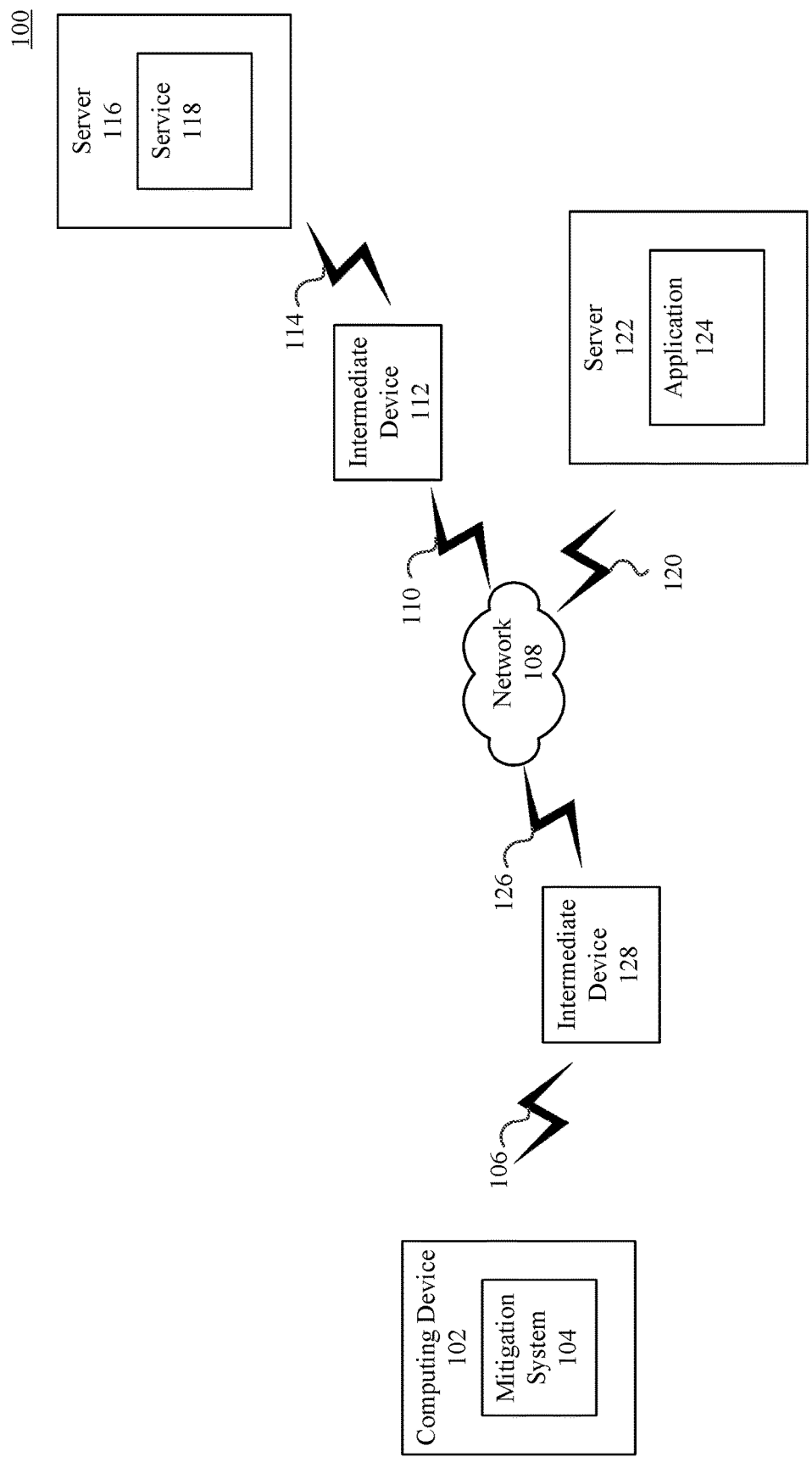
FIG. 1 is a block diagram of a system that includes a computing device that includes a mitigation system, according to an example embodiment.

The mitigation of security risks associated with unsecured websites and networks may be enabled in various in embodiments. For instance, FIG. 1 is a block diagram of a system 100 that includes a computing device having a mitigation system 104, according to an example embodiment. As shown in FIG. 1, system 100 includes a computing device 102, an intermediate device 112, an intermediate device 128, a server 116, and a server 122. System 100 is described in further detail as follows.

As shown in FIG. 1, server 122 may connect to network 108 via connection 120. Intermediate device 112 and intermediate device 128 are each optionally present. When present, computing device 102 and server 116 may connect to network 108 via intermediate device 128 and intermediate device 112, respectively. That is, computing device 102 may connect to intermediate device 128 via connection 106, and intermediate device 128 may connect to network 108 via connection 126. Server 116 may connect to intermediate device 112 via connection 114, and intermediate device 112 may connect to network 108 via connection 110. In other embodiments, intermediate device 112 and/or intermediate device 128 may not be present. As such, computing device 102 and/or server 116 may connect to network 108 directly rather than through an intermediate device. In other embodiments, multiple intermediate devices may be present between computing device 102 and network 108, and/or between server 116 and network 108, such that additional network connections are present.

Computing device 102 is a computing device for a user (e.g., individual user, family users, enterprise users, governmental users, etc.) who may access network-accessible resources, such as server 116 and server 122 over network 108 using computing device 102. System 100 may include fewer or more computing devices than depicted in FIG. 1. Computing device 102 may be any type of stationary or mobile computing device, including a mobile computer or mobile computing device (e.g., a Microsoft® Surface® device, a Google™ Chromebook™, an Apple® MacBook®, a personal digital assistant (PDA), a laptop computer, a notebook computer, a tablet computer such as an Apple® iPad™, a netbook, etc.), a smartphone, a mobile phone, a wearable computing device, or other type of mobile device, or a stationary computing device such as a desktop computer or PC (personal computer), or a server. Computing device 102 is configured to store data and execute one or more computer programs, applications and/or services. For example, computing device 102 includes mitigation system 104 to protect computing device 102 or a user thereof from attackers. In an example embodiment, mitigation system 104 may include processing circuit that executes one or both of software and/or firmware to perform operations. Mitigation system 104 may be a standalone application or mitigation system 104 may be integrated into other applications. Computing device 102 may also include further applications, such as web browsers or electronic mail (email) clients. In an example embodiment, mitigation system 104, wholly or partially, may be included in a web browser or any other application on computing device 102. For example, mitigation system 104 may be included as an extension to a web browser on computing device 102.

Network 108 may comprise one or more networks such as a local area networks (LANs), wide area networks (WANs), enterprise networks, the Internet, etc., and may include one or more wired or wireless portions. In an embodiment, computing device 102, server 116, and server 122 may communicate over network 108 via one or more application programing interfaces (API) or in any other manner. Network 108 may be configured as a private or a public network on computing device 102. A private network may be a trusted network through which encrypt data is transmitted and may require a password for access. For example, a private network may be configured with any of the following security modes: wired equivalent privacy (WEP), Wi-Fi protected access (WPA), Wi-Fi Protected Access II (WPA2). With each security mode, different types of encryption may be used, such as temporal key integrity protocol (TKIP) or advanced encryption standard (AES). A trusted network may be a home network, an office network or the like, that enables network discovery, file and printer sharing among machines on the network. In contrast, a public network allows unencrypted data to be transmitted therethrough and may not require a password for access. A public network may be owned by a commercial business (e.g., coffee shop, airport, shopping center) in a public place and may not automatically allow network discovery or file and printer sharing among machines on the network. The configuration of the network may be set by an operating system of a device, a system administrator, or the user of computing device 102. The network settings related to network security, network discovery or file and printer sharing for network 108 may be stored in a network profile by or otherwise accessible by the operating system of computing device 102. The network settings may also be available to applications installed on or accessible by computing device 102.

Connections 106, 110, 114, 120, and 126 are each network connections that communicatively couple devices for the communication of data signals between the devices. Examples of connections 106, 110, 114, 120, and 126 include network cables such as Ethernet cables and USB (universal serial bus) cables, and wireless links such as personal area networks (PANs), wireless local area networks (WLANs), wide area networks (WANs, such as Internet links), etc. Communication signals may be transmitted over such connections in any manner, including packet-based communications such as TCP-IP (Transmission Control Protocol-Internet Protocol), wireless protocols such as IEEE (Institute of Electrical and Electronics Engineers) 802.11, etc.

As shown in FIG. 1, computing device 102 may be connected to an intermediate device 128 (e.g., a mobile Wi-Fi hotspot, a smart phone, etc.), which may be connected to network 108 via a connection 126. In such case, computing device 102 is connected to network 108 by connections 106 and 126, with intermediate device 128 bridging connections 106 and 126. Connection 106 to intermediate device 128 may appear to be a secure connection to computing device 102, even though connection 126 between intermediate device 128 and network 108 may be unsecured. In this case, whichever is the most unsecured connection may dictate whether mitigation measures are needed.

Server 116, server 122, and additional resources may define a network accessible server infrastructure. In example embodiments, servers 116 and server 122 may form a network-accessible server set, such as a cloud computing server network. For example, server 116 and server 122 may comprise a group or collection of servers (e.g., computing devices) that are each accessible by a network such as the Internet (e.g., in a "cloud-based" embodiment) to store, manage, and process data. System 100 may include any number of servers, fewer or more than the number of servers shown in FIG. 1. While not shown, system 100 may include additional resources that facilitate communications with and between servers (e.g., network switches, networks, etc.), storage by the servers (e.g., storage devices), resources that manage other resources (e.g., hypervisors that manage virtual machines to present a virtual operating platform for tenants of system 100, etc.), and other further types of resources. Server 116 and server 122 may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, server 116 and server 122 may be co-located (e.g., housed in one or more nearby buildings with associated components such as backup power supplies, redundant data communications, environmental controls, etc.) to form a datacenter, or may be arranged in other manners. In accordance with this embodiment, each of server 116 and server 122 may be configured to service a particular geographic region. For example, server 116 and server 122 may be configured to service the northeastern region of the United States, and other servers may be configured to service the southwestern region of the United States. As another example, server 116 and server 122 may be respectively configured to service the northeastern region and southwestern region of the United states. Server 116 and server 122 may service any number of geographical regions worldwide.

Each of server 116 and server 122 may be configured to execute one or more services (including microservices), applications, and/or supporting services. A "supporting service" may be a cloud computing service/application configured to manage a set of servers (e.g., a cluster of servers) to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be coded in any programming language. Each of server 116 and server 122 may be configured to execute any number of services, including multiple instances of the same and/or different supporting services. As a non-limiting example, server 116 may provide a service 118, and server 122 may include an application 124. Although mitigation system 104 is shown as being included in computing device 120 in FIG. 1, in embodiments, mitigation system 104, at least in part, may be implemented at a server, such as server 116 or server 122. There may be multiple instances of mitigation system 104.

Figure 2:
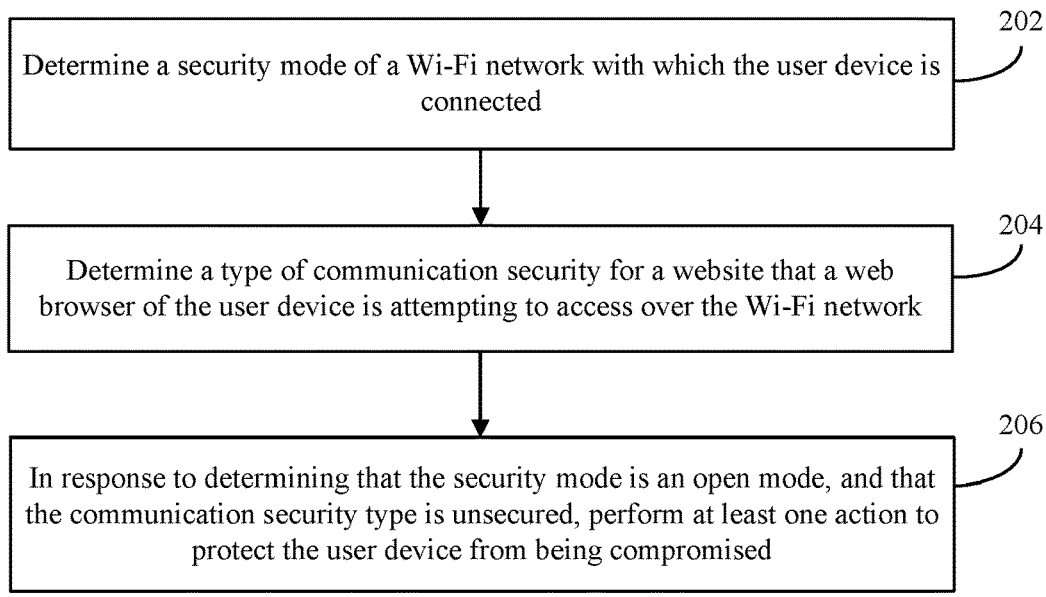
FIG. 2 depicts a flowchart of a method for mitigating security risks associated with an unencrypted website and unsecure network, according to an example embodiment.

Further operational aspects of system 100 of FIG. 1 will now be discussed in conjunction with FIG. 2 which depicts a flowchart 200 of an example method for mitigating security risks associated with an unsecured website and network, according to an embodiment. In an embodiment, mitigation system 104 may perform flowchart 200. Although described with reference to system 100 of FIG. 1, the method of FIG. 2 is not limited to that implementation. Other structural and operational embodiments will be apparent to persons skilled in the relevant art(s) based on the following discussion regarding flowchart 200 and system 100 of FIG. 1.

Flowchart 200 is an example method for mitigating security risks associated with an unsecured website and network. Flowchart 200 begins at step 202. At step 202, a security mode of a Wi-Fi network with which the user device is connected is determined. For example, and with reference to system 100 of FIG. 1, mitigation system 104 may determine the security mode of network 108 with which computing device 102 is connected. As described above, network 108 may be a public or private network. In an example embodiment, network 108 may be a public Wi-Fi network that does not require a user to enter a password for access to network 108. As a public Wi-Fi network, network 108 may not provide data encryption and may be less secure than a private network. Thus, the security mode of network 108 may be an open mode or open public Wi-Fi or a private mode or private Wi-Fi. The security mode of network 108 may be provided to computing device 102, and thus to mitigation system 104, when computing device 102 connects to network 108. For example, the security mode may be provided from a network router or other network device that interfaces computing device 102 with network 108, when selected for connection by a user (or automatically connected to) that interacts with a network connection tool of an operating system (OS) of computing device 102. Flowchart 200 of FIG. 2 continues at step 204.

In step 204, a type of communication security is determined for a website that a web browser of the user device is attempting to access over the Wi-Fi network. For example, and with continued reference to system 100 of FIG. 1, mitigation system 104 may be configured to determine a type of communication security for a website that a web browser of computing device 102 is attempting to access over network 108, in an embodiment. Computing device 102 may include a software that includes computer programming logic for a web browser (e.g., Mozilla® Firefox™, Google™ Chrome™ Microsoft® Edge®, and Apple® Safari®) for browsing or providing access to the Internet. In an example embodiment, mitigation system 104 may be included as part of such a web browser. Thus, when the web browser is attempting to access a website over network 108, mitigation system 104 may determine a type of communication security for the website, such as by an address used to connect with the website (e.g., detecting the address including "HTTPS" for a secure website, or "HTTP" for an insecure website).

An unencrypted or unsecured website may use the hypertext transfer protocol (HTTP) that allows communication between different systems, notably, the transferring of data between a web server to a web browser on a user device. HTTP data is not encrypted and may be intercepted by third parties. Thus, an address for an unsecured website may be indicated by the HTTP notation, for example, http://notsecure.example.com. In contrast, HTTPS (where the "S" stands for "Secure") data involves the use of an SSL (secure sockets layer) certificate that creates a secure connection between the web server and the web browser. The SSL certificate may be installed on the web server to authenticate the identity of the website and encrypt data that is transmitted. There are many types of SSL certificates issued by trusted organizations. An address for a secure website may be indicated by the HTTPS notation, for example, https://secure.example.com. Mitigation system 104 may determine the type of communication security for the website by any means, such as based on the web address for the website, the transfer protocol, or the SSL certificate(s). In an example embodiment, a website may include multiple web pages, some of which may be secure, some of which are not. Thus, each connection or web page associated with a website may be checked to determine the type of communication security. The type of communication security for the website may be secure or unsecured, with the unsecured website including one or more unsecured connection that presents more security risks to the computing device 104 or its user.

Flowchart 200 of FIG. 2 concludes at step 206. In step 206, in response to determining that the security mode is an open mode, and that the communication security type is unsecured, a mitigation action may be performed. For example, and with continued reference to system 100 of FIG. 1, when the security mode of network 108 is "open" (not secured) and the website (e.g., provided by server 118) is unsecured (not encrypted), mitigation system 104 may be configured to perform one or more mitigation actions, in example embodiments. For example, mitigation system 104 may perform the mitigation actions such as generating a visual warning in a graphical user interface of a web browser, preventing the transmission of sensitive information over the open Wi-Fi network (e.g., network 108 in FIG. 1), an/or disallowing or temporarily halting execution of scripts and resources of inactive web browser tabs. Step 206 may be performed at any time, including when a website is first accessed, when there is a change in the network connection, and/or any other time.

Other mitigation measures may be alternatively or additionally taken in step 206 depending on the determination steps (e.g., 202, 204). For example, for each set of criteria that is met (e.g., a combination of an open Wi-Fi network and an unsecured website, a combination of an open Wi-Fi network and a secure website, a combination of a private Wi-Fi network and a secure website, or a combination of a private Wi-Fi network and an unsecured website), a corresponding mitigation action(s) may be initiated to mitigate security risks. Non-limiting examples of mitigation actions may include recording an entry in an event log (to alert a security administrator), modifying a window frame or a user interface element of an application to indicate the level of security risk associated with that application, presenting an alert (e.g., textual, graphical, static, dynamic, audio, etc.) upon detecting that sensitive information is about to be transmitted, prompting the user to mitigate the risk by using a more secure method (e.g., using a virtual private network), or requesting a developer of an unsecured website to use a more secure protocol (i.e., HTTPS).

In the foregoing discussion of flowchart 200, it should be understood that at times, the steps of flowchart 200 may be performed in a different order or even contemporaneously with other steps. For example, the determining steps 202 and 204, may be performed in a different order or even simultaneously. As another example, the steps of 202-206 may be repeated whenever there is a network change. Other operational embodiments will be apparent to persons skilled in the relevant art(s). Note also that the foregoing description of the operation of system 100 is provided for illustration only, and embodiments of system 100 may comprise different hardware and/or software, and may operate in manners different than described above.

Figure 3:
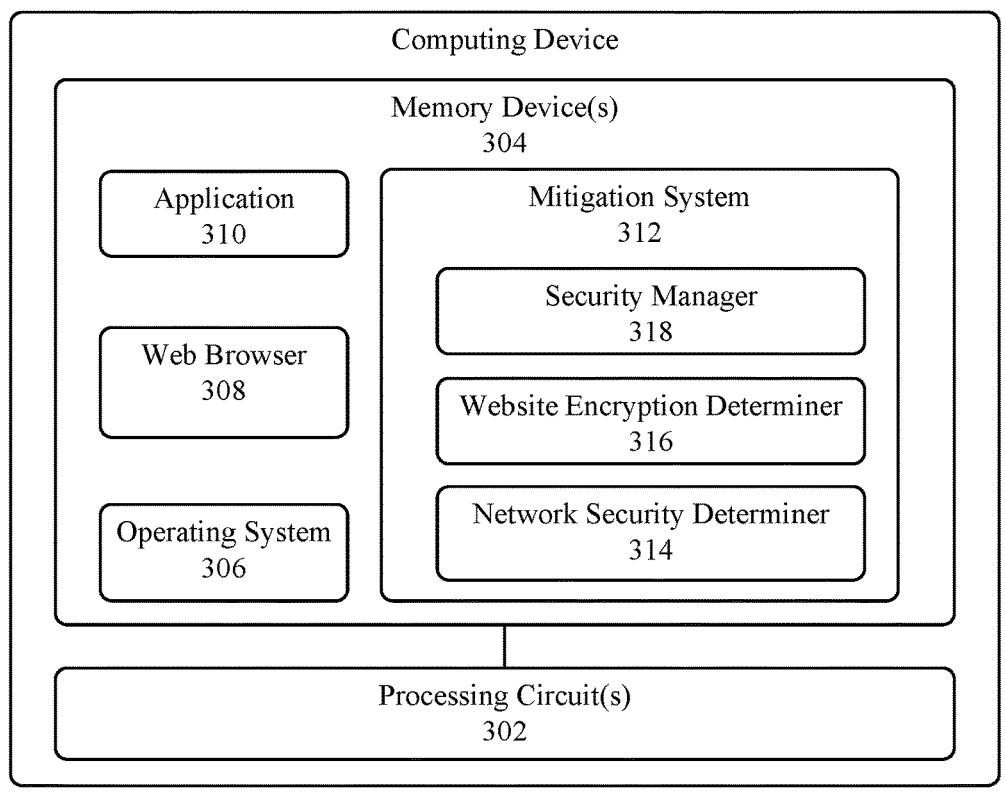
FIG. 3 is a block diagram of a computing device that comprises a mitigation system for mitigating security risks associated with an unencrypted website and unsecure network, according to an example embodiment.

For example, FIG. 3 is a block diagram of a computing device 300 that may be implemented as computing device 102 in system 100 of FIG. 1. Computing device 300 may include one or more processing circuits 302 connected to one or more memory devices 304.

Processing circuits 302 may include one or more microprocessors, each of which may include one or more central processing units (CPUs) or microprocessor cores. Processing circuits 302 may also include a microcontroller, application-specific integrated circuit (ASIC), field-programmable gate array (FPGA), and/or other processing circuitry. Processing circuit(s) 302 may operate in a well-known manner to execute computer programs (also referred to herein as computer program logic). The execution of such computer program logic may cause processing circuit(s) 302 to perform operations, including operations that will be described herein. Each component of computing device 300, such as memory devices 304 may be connected to processing circuits 302 via one or more suitable interfaces.

Memory devices 304 include one or more volatile and/or non-volatile memory devices. Memory devices 304 store a number of software components (also referred to as computer programs), including an operating system 306, a web browser 308, an application 310 and mitigation system 312, each of which may be executed by processing circuits 302. Memory devices 304 may also store other software components not shown in FIG. 3. The features of FIG. 3 are further described as follows.

Operating system 306 comprises a set of programs that manage resources and provide common services for applications and systems, such as application 310 or mitigation system 312, that may be executed on computing device 300. Operating system 306 may include components (e.g., device drivers or other software) necessarily to manage the networking of computing device 300. For example, operating system 306 may include an implementation of Transmission Control Protocol/Internet Protocol (TCP/IP) stack and related programs. For example, operating system 306 may include a utility tool or command to test the reachability of a host on an Internet Protocol (IP) network, or a computer network diagnostic tool or command for displaying a route and measuring transit delays of packets across the IP network. Operating system 306 may also include input modules and output modules to enable user interaction with computing device 300.

Operating system 306 may configure a network, such as network 108 shown in FIG. 1, to be a private network or a public network with or without user input. Operating system 306 may also detect network connections and changes thereof. For example, when a user of computing device 300 first connects to a new network, the user may be asked to select a location for it, such as home, work, public, or private. Depending on the location selected, certain features (e.g., file and printer sharing, network discovery) may be automatically turned on or off. The network location selection may be saved in a network profile such that the user does not have to perform the network setup or location selection for a network multiple times. The network profiles may be saved locally on computing device 300 or elsewhere. Operating system 306 may subsequently use the saved network profile to automatically connect to the network with all the relevant networking features.

Computing device 300 may include one or more web browsers, such as web browser 308. Although FIG. 1 shows one web browser, any number of web browsers may be installed in computing device 300. Web browser 308 may be a computer program or application used to access websites, web pages thereof, or information on a network, such as the Internet. Non-limiting examples of web browser 308 include Mozilla® Firefox™, Google™ Chrome™, Microsoft® Edge®, and Apple® Safari®. Web browser 308 may include components such as a user interface (UI), a browser engine, a rendering engine, a networking component, a JavaScript interpreter, a UI backend, and storage. Web browser 308 may communicate with a server and retrieve web pages requested by the user of computing device 300. For example, when the user enters a web address or URL (Uniform Resource Locator) into the address bar of web browser 308, web browser 308 may determine the protocol (e.g., HTTP) and the location of the web server from which to retrieve the web page. Once web browser 308 reaches the web server, web browser 308 may retrieve code (e.g., Hypertext Markup Language), interpret, and render the code for the web page on a graphical user interface (GUI) of web browser 308 for viewing by the user. The GUI of web browser 308 may include the address bar, navigational buttons, tabs, and a portion (e.g., a window, frame, and/or tab) for rendering the web page.

Computing device 300 may also include applications, such as application 310, each including a computer program that may be executed by processing circuits 302 to perform certain operations, the type of which may vary depending upon how the application is programmed. Application 310 may be any type of application, including but not limited to a database application, an e-mail application, a productivity application, a social networking application, a messaging application, a financial services application, a news application, a search application, a productivity application, or the like. Although FIG. 1 shows one application, any number of applications may be present at computing device 300 or accessible by computing device 300.

Mitigation system 312 may include software components that may be executed by processing circuits 302 to perform operations to mitigate security risks to computing device 300 and the user thereof. In an example embodiment, mitigation system 312 may be implemented as mitigation system 104 in system 100 of FIG. 1. Mitigation system 312 is shown in FIG. 3 as a standalone system, although mitigation system 312 may be partially or wholly integrated into other systems or applications, such as application 310, web browser 308, or operating system 306. Moreover, the components of mitigation system 312 may all be included in computing device 300 or may be included in computing device 300 and other devices, such as servers. Mitigation system 312 is described as follows.

Mitigation system 312 may include a network security determiner 314, a website encryption determiner 316, and a security manager 318, each of which may include computer program logic that may be executed by processing circuits 302 to mitigate security risks to computing device 300 and the user of computing device 300. Network security determiner 314 may be configured to determine a security mode of a Wi-Fi network (e.g., network 108 in FIG. 1) with which computing device 300 is connected. Website encryption determiner 316 may be configured to determine a type of communication security for a website that a web browser (e.g., web browser 308) of computing device 300 is attempting to access over the Wi-Fi network. Security manager 318 may be configured to perform at least one action to protect computing device 300 and/or the user thereof from being compromised in response to certain conditions, such as when the security mode of the Wi-Fi network is an open mode and the communication security type for the website is unsecured. Mitigation system 312 and its components will be further described in connection with FIGS. 4-12.

Figure 4:
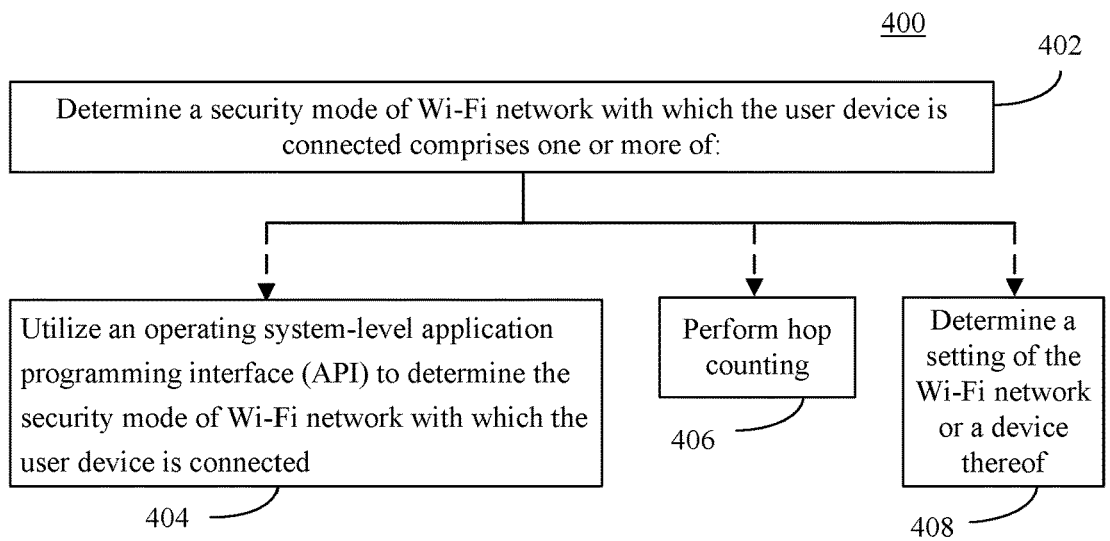
FIG. 4 depicts a flowchart of a method of determining a security mode of a Wi-Fi network, according to an example embodiment.

The determining of a security mode of a network will now be described in more detail in reference to FIG. 4. In particular, FIG. 4 is a flowchart 400 of a method of determining a security mode of a Wi-Fi network, according to an example embodiment. Flowchart 400 includes refinements or additions to the method steps of flowchart 200 as depicted in FIG. 2. Thus, the method of flowchart 400 will be described with continued reference to system 100 of FIG. 1 and computing device 300 of FIG. 3. However, other structural and operational embodiments will be apparent to persons skilled in the relevant art(s) based on the following discussion regarding flowchart 400.

As shown in FIG. 4, the method of flowchart 400 begins at step 402, in which a security mode of a Wi-Fi network with which the user device is connected is determined using one or more of several techniques shown in steps 404, 406 and 408. Steps 402, 404, 406 and 408 may each be performed, for example, by network security determiner 314 of FIG. 3. Each of steps 404, 406, and 408 are described as follows.

At step 404, an operating system-level API is utilized to determine the security mode of the Wi-Fi network with which the user device is connected. In an example embodiment, network security determiner 314 may use (e.g., query) or invoke an operating system-level API to determine the security mode of the Wi-Fi network (e.g., network 108 in FIG. 1) with which computing device 300 is connected. In an alternate example embodiment, the determination of the security mode of the Wi-Fi network may be made by operating system 306, and provided to other applications (e.g., mitigation system 312, web browser 308, or application 310) automatically or upon request. The security mode of the Wi-Fi network may be any of a private mode, a public mode or an open mode. The private mode may be more secure than the public or open mode. Some public Wi-Fi networks may be secure (e.g., password protected). However, as referred to herein, the open mode public Wi-Fi network is a public Wi-Fi network that is not secure and does not require a password for access. From the security mode for the Wi-Fi network, network security determiner 314 may determine whether the public Wi-Fi network is secure, and the appropriate measures to take to mitigate security risks if the public Wi-Fi network is an open mode one.

In example embodiments, operating system 306 shown in FIG. 3 may include APIs, components, and services that support applications in networking. Non-limiting examples of the support that operating system 306 provides may include delivery optimization (DO) service, domain name system (DNS) service, Dynamic Host Configuration Protocol (DHCP) API, connection APIs (e.g., Get Connected Wizard API), HTTP server API, IP Helper, management information base API, message queuing technology, multicast address dynamic client allocation protocol (MADCAP), network interfaces, network list manager API, network management functions, network share management service, peer-to-peer technologies, remote procedure call (RPC), routing and remote access service (RAS), simple network management protocol, server messaging block (SMB) management API, telephony API, websocket protocol component API, networking functions, HTTP services, or Internet API. In an example embodiment, any API, service or component may be used to determine the security mode of the Wi-Fi network (e.g., network 108 in FIG. 1) with which computing device 300 is connected.

At step 406, hop counting is performed. For example, hop counting may be performed between computing device 300 and a server (e.g., server 116 or server 122 shown in FIG. 1) that is hosting or otherwise associated with the website that computing device 300 is attempting to access. In an example embodiment, network security determiner 314 may use a networking program, an operating system tool or command (e.g., tracert) to perform hop counting. Hop count may be the total number of intermediate devices (e.g., routers, access points, or repeaters) through which a given piece of data or data packet passes along a path between two nodes, a source (e.g., computing device 102 shown in FIG. 1) and a destination (e.g., server 116 or server 122 shown in FIG. 1). Each intermediate device (e.g., intermediate device 128, intermediate device 112) forms a hop. A hop count may be considered a measurement of the distance in a given network. Thus, the hop count may provide an approximate measure of the distance between two given nodes. As a data packet passes through a device, the device may modify the packet as well as increasing the hop count by one. The device may also compare the hop count against a defined threshold (e.g., a time-to-live limit) and may eliminate the data packet if the hop count is high or if the data packet has been routed along a suspicious path. For example, a suspicious path may include a data packet sent from a host in California being routed through a device located in a country that is a security concern (e.g., Russia) before ending back in a host in California. In this example, the path does not follow normal routing operations, and thus that data packet may be treated as suspicious. Thus, from the hop counting operation, network security determiner 314 may determine whether the data packet is corrupted or should not be trusted, which may indicate that the currently connected network is not secure and mitigation actions may be needed.

At step 408, a setting of the Wi-Fi network or a device thereof is determined. In an example embodiment, network security determiner 314 may determine a setting of the Wi-Fi network or the Wi-Fi device or router by any means available, such as via operating system 306, by invoking a networking tool, command or API, querying or accessing the Wi-Fi device for its settings, or accessing the networking profile that is currently used. The settings of the Wi-Fi network or the Wi-Fi device or router may be configured by operating system 306 and/or the user of computing device 300. Thus, from the settings, the security mode of the Wi-Fi network may be determined. For example, the settings of the Wi-Fi device or router may indicate the security mode as open, WEP, WPA or WPA2, in order of increasing security. As another example, the location or name of the Wi-Fi network may be informative. A home or work location/name may be more private than a public location or a network having a name of a commercial entity. Accordingly, network security determiner 314 may determine whether the currently connected network is a trusted or secure network. For example, when the location for the Wi-Fi network is determined to be "public" and/or the security mode is "open" then network security determiner 314 may conclude that the Wi-Fi network is not secure and that mitigation measures are necessary. In contrast, if the security mode is WPA2 and/or the location is determined to be "home" or "work," mitigation measures may not be necessary.

Mitigation measures may be performed by mitigation system 312 when necessary. In particular, FIGS. 5-9 depict flowcharts 500-900, respectively, each of which is a method for performing a mitigation action, according to example embodiments. In embodiments, flowchart 500-900 may be performed by security manager 318 in FIG. 3. Flowcharts 500-900 include additions or refinements to the method steps of flowchart 200 as depicted in FIG. 2. Thus, the methods of flowcharts 500-900 will also be described with continued reference to system 100 of FIG. 1 and computing device 300 of FIG. 3. However, other structural and operational embodiments will be apparent to persons skilled in the relevant art(s) based on the following discussion regarding flowcharts 500-900.

Figure 5:
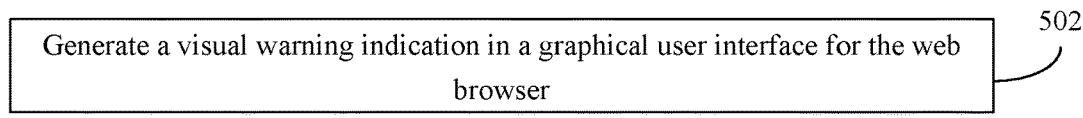

As shown in FIG. 5, the method of flowchart 500 includes step 502, in which a visual warning indication is generated in a graphical user interface for the web browser. For example, this step may be performed by security manager 318 shown in FIG. 3. In an example embodiment, in response to determining that the security mode of the Wi-Fi network is an open mode and that the communication security type for the website that a web browser (e.g., web browser 308) is attempting to access is unsecured, security manager 318 may generate a visual warning indication in the GUI of web browser 308. The visual warning indication may be generated and rendered anywhere in the GUI of web browser 308, such as on a frame of web browser 308, on a tab frame associated with the website, in an address bar, in a tool bar, or in a portion for rendering a web page of the website. The visual warning indication may be any type of visual treatment employed to highlight the determined security risks, particularly that of the open Wi-Fi network and the unsecured website. Non-limiting examples of visual warning indications include changing a color (e.g., to red or purple) of a frame of web browser 308 or a tab of web browser 308 that is associated with the unsecured website, changing a text, an object or icon size or color, changing a background color, changing a color or appearance of an input field, preventing user input in a field, generating a separate warning window, changing the spacing of the GUI. Any type of visual treatment may be used, and the treatment may be static or dynamic (e.g., a flashing purple frame for web browser 308). For example, when user is attempting to access an unsecured website over an open Wi-Fi network, the "unlock" icon may be changed to red, alone or in combination with an icon indicating the open Wi-Fi network in web browser 308. If the unsecured website includes input fields, these may be highlighted in red, shown with a warning icon, or shown as grayed out to indicate that input to the fields are being prevented (e.g., if the fields are for sensitive data such as password or credit card information).

Security manager 318 may perform other mitigation actions in addition to or in the alternative depending on the determinations of network security determine 314, and website encryption determiner 316. For example, for each set of criteria that is met (e.g., a combination of an open Wi-Fi network and an unsecured website, a combination of an open Wi-Fi network and a secure website, a combination of a private Wi-Fi network and a secure website, or a combination of a private Wi-Fi network and an unsecured website), a corresponding mitigation action or set of actions may be initiated to mitigate security risks. Each set of criteria may correspond to a security risk level that is based on numerical scale (e.g., 1-4) or a type of security risk (e.g., A-F) or any organizational or ranking scheme. Non-limiting examples of mitigation actions may include recording an entry in an event log (to alert a security administrator), modifying a window frame or a UI element of an application to indicate the level of security risk associated with that application, prompting the user to mitigate the risk by using a more secure method (e.g., using a virtual private network (VPN)), or requesting a developer of an unsecured website to change to a more secure protocol (i.e., HTTPS). Each of the mitigation actions may be performed by security manager 318 or may be facilitated by operating system 306 on behalf of security manager 318. In example embodiments, other warning indications may also be employed, such as audio, electrical and/or mechanical vibration, etc.

Accordingly, based on the security risk level or type of security risk, one or more mitigation actions may be performed. The mitigation actions may be ranked in order of relevance relative to the security risk level or type. Thus, if the security risk level is low (e.g., a level 1), less intrusive mitigation actions may be performed or one mitigation action may be performed. In contrast, if the security risk level is deemed to be high (e.g., a level 3 or 4), more stringent mitigation measures or multiple mitigation actions may be employed to protect the user device or the user against the security risks. The determination of which mitigation action to perform for a particular risk level or combination of risks may be made by mitigation system 312, a user of computing device 300 or both. For example, for a combination of an unsecured website and any security mode for a Wi-Fi network (e.g., open or private) at least one mitigation action may be performed. In another example, a combination of a secure website and any security mode for a Wi-Fi network (e.g., open or private) no mitigation action may be necessary.

Figure 6:
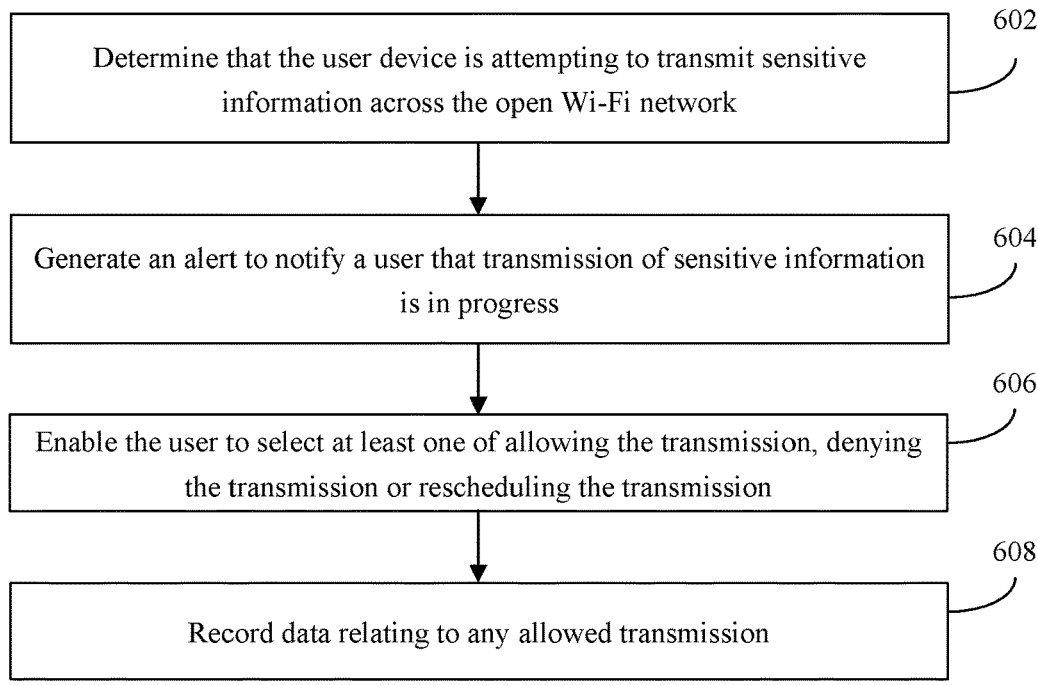

FIG. 6 depicts a flowchart 600 of another method for performing a mitigation action, according to an example embodiment. The method of flowchart 600 may be performed by computing device 300 of FIG. 3, although flowchart 600 is not limited to this embodiment. At times, the steps of flowchart 600 may be performed in a different order or even contemporaneously with other steps. In addition, some steps may not be performed or may be performed multiple times.

The method of flowchart 600 begins at step 602, in which the user device is determined to be attempting to transmit sensitive information across the open Wi-Fi network. This step may be performed by security manager 318 of FIG. 3. For example, security manager 318 may determine that computing device 300 is in the process of transmitting sensitive information via an application (e.g., web browser 308 or application 310) over an open Wi-Fi network (e.g., network 108 shown in FIG. 1). Sensitive information may be private user information such as credit card information, social security number, password, or restricted organizational data such as medical data, financial data, proprietary data, classified data, privileged data, or other data that may lead to personal, financial or business harm if intercepted by hackers.

Identification of sensitive information may be performed by any technique or means. For example, rules may be employed to determine whether information is sensitive and should not be transmitted over an unsecured network. For example, one rule may be not to transmit any data determined to be a social security number, and the determination may be based on a particular number format and/or associated identifying data or metadata. As another example, another rule may be not to transmit any data that is marked as "privileged" or "classified" over an open Wi-Fi network. In an example embodiment, artificial intelligence may be utilized to aid in the determination of sensitive information. For example, computer programs including a machine learner may be stored in computing device 300 or any other device (e.g., server 116 or server 122). Such a machine learner may comprise computer program logic that, when executed by processing circuits 302, cause processing circuits 302 to accept training data input and use such training data to obtain or update a model, which comprises an algorithm for determining whether a given data packet includes sensitive information. Such training data may include sample sensitive data, such as residential addresses, email addresses (e.g., indicative by the @ symbol), bank account numbers or routing codes, social security numbers, privileged information marked as such, etc. The training data may also include data or metadata that is associated with or identifies the sensitive data, for example, field names.

Flowchart 600 continues at step 604, in which an alert is generated to notify a user that transmission of sensitive information is in progress. This step may be performed by security manager 318 of FIG. 3, for example. In an example embodiment, security manager 318 may generate an alert in any form, for example, textual, graphical, static, dynamic, audio, etc. In this manner, the attention of the user may be directed to the fact that sensitive information is in the process of being transmitted over the open Wi-Fi network and/or to an unsecured destination. Thus, the user is enabled to make a more informed decision as to how to proceed with the transmission.

The method of flowchart 600 continues at step 606, in which the user is enabled to select at least one of allowing the transmission, denying the transmission or rescheduling the transmission. This step may be performed by security manager 318 of FIG. 3 or operating system 306 individually or combined. In an example embodiment, mitigation system 312 may be integrated with an email application (e.g., application 310). In such an example embodiment, security manager 318 may determine that application 310 is in the process of sending a sensitive email marked "attorney-client privilege" over an open Wi-Fi network. In this embodiment, security manager 318 may enable the user to select one or more options regarding the transmission. For example, security manager 318 may present the user with an option to allow the transmission to occur at this time, despite the user device being connected to the open Wi-Fi network. Security manager 318 may also present the user with an option to deny the transmission to occur given the current network condition. Security manager 318 may also present the user with an option to reschedule the transmission, for example, modify or edit the date or time of transmission or indicate the condition in which transmission may occur, e.g., when the connected network is private mode.

In another example embodiment, before the email is sent, mitigation system 312 may remove the email from the outbound queue to prevent the sensitive email from being transmitted with or without notification to the user. For example, mitigation system 312 may inform the user of computing device 300 that the sensitive email was not sent because the open Wi-Fi network is not secure. Mitigation system 312 may automatically place the sensitive email back into the outbound queue when computing device 300 is once more connected to a secure network. In another example embodiment, operating system 306 may also perform the prevention step to block the sensitive email from being transmitted over the public Wi-Fi network, for example, when mitigation system 312 is unable to or fails to prevent the email from being transmitted.

In another example embodiment, mitigation system 312 may be integrated with a web browser (e.g., web browser 308). For example, if mitigation system 312 detects that a user is attempting to transmit a credit card number over an open Wi-Fi network to an unsecured web page, mitigation system 312 may act to prevent such transmission. However, if mitigation system 312 detects that the user is attempting to transmit a social security number over an open Wi-Fi network to a secure web page, mitigation system 312 may present a warning to the user regarding the unsecured network but may proceed to transmit the social security number because the data will be encrypted. Accordingly, the decision of whether a type of sensitive data is transmitted over an open Wi-Fi network may vary based on user or system configurations. Alternatively or in addition, mitigation system 312 may notify the user that sensitive information is being transmitted and solicit user feedback regarding how the transmission should be handled. For example, mitigation system 312 may present the user with options to allow, deny, or postpone the transmission to a later time or date or when the network or web page is more secure (e.g., when the connected network is private or when the HTTPS version of the web page is accessed instead of the HTTP version).

Flowchart 600 concludes with step 608, in which data relating to any allowed transmission is recorded. This step may be performed by security manager 318 of FIG. 3 or operating system 306 individually or combined. To continue with the example in which mitigation system 312 is integrated with a web browser (e.g., web browser 308), security manager 318 may record data relating to any transmission that is allowed by the user of device 300 or by mitigation system 312. Such data may include payload data (e.g., the sensitive information), and any data relating to the payload data or the transmission, including transmission times, a source (e.g., the application that allowed or initiate the transmission, computing device 300), a destination (e.g., a server, a web page address), any intervening device or its address, etc.

Figure 7:
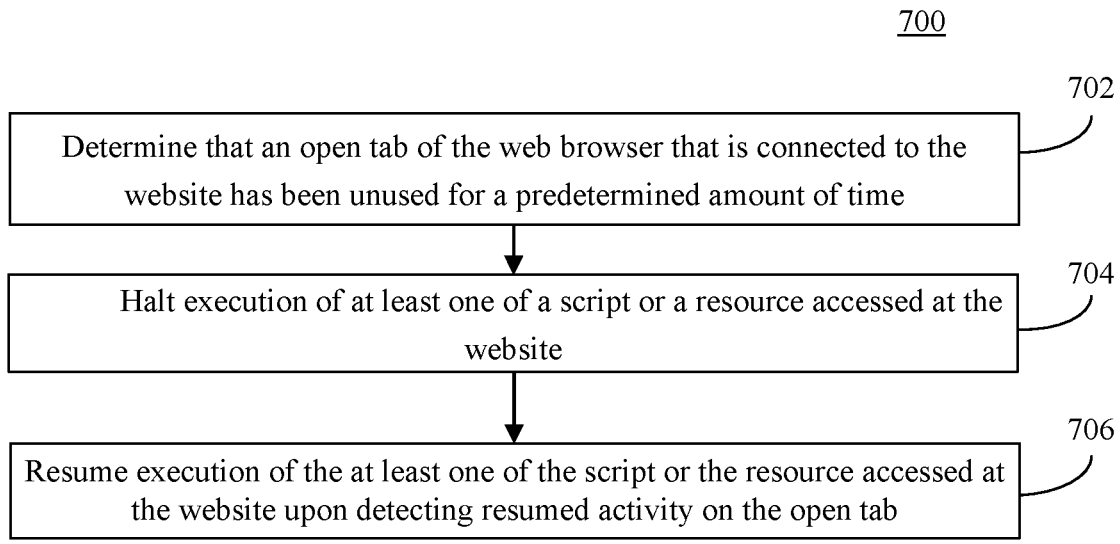

FIG. 7 depicts a flowchart 700 of another method for performing a mitigation action, according to an example embodiment. The method of flowchart 700 may be performed by computing device 300 of FIG. 3, although flowchart 700 is not limited to this embodiment. The method of flowchart 700 begins at step 702, in which an open tab of the web browser that is connected to the website has been determined to be unused for a predetermined amount of time. For example, in an embodiment where mitigation system 312 is integrated or associated with web browser 308, when a user of computing device 300 enters a web address in the address bar, web browser 308 may open the web page associated with that web address on a first tab. The user may then desire to view other web pages and open other tabs, and thus leaving the first tab inactive. The predetermined amount of time (e.g., 5 minutes or 50 clock cycles) may be configured by the user or mitigation system 312.

Flowchart 700 continues with step 704, in which at least the execution of at least one of a script or a resource accessed at the website is halted. To continue with the example embodiment from step 702, when web browser 308 or mitigation system 312 detects that the first tab has been unused for a predetermined amount of time (e.g., 5 minutes) that first tab may be automatically halted or suspended by web browser 308 or mitigation system 312, respectively. The suspended tab is not closed completely but is placed in a state that consumes minimal resources, such as memory, battery or processing power. A web page may include numerous types of information that may be seen, heard, interacted with by the user or hidden from the user. Such types of information may include textual, non-textual (e.g., images that are static or animated, audio, or video), user interactive and internal or hidden information. Any of these types of information may be used to render the web page and may be included in a resource file or a script (e.g., cascading style sheets (CSS), Flash, Java applets, JavaScript, HTML, DHTML).

By suspending the first tab, resources may be saved for computing device 300. More importantly, tab suspending may take into consideration the type of communication security for the web page associated with the first tab as well as the security mode of the network to which computing device 300 is connected. Thus, computing device 300 may be protected against harmful or resource-intensive scripts or the like. Such resource or script may be accessed at the web page as part of that web page or interjected into the web page by some third party. Accordingly, if the type of communication security for the web page is secure and the security mode of the Wi-Fi network is private, it may not be necessary to suspend a tab. In contrast, if the type of communication is unsecured and the security mode of the Wi-Fi network is open, it may be necessary to suspend a tab. In the case where one of the type of communication security for the web page or the Wi-Fi security mode is unsecured, tab suspending may or may not be performed. Certain factors may serve to determine whether tab suspending is performed in this case. The factors may be configured settings or preferences, the amount of time the tab is inactive, the type and number of resource and/or scripts that is being executed, the number of tabs that are active or inactive, etc. These factors may also aid in determining which resource or script to suspend for a tab. In an example embodiment, all scripts or resources may be suspended for the tab. In another example embodiment, selected scripts or resources may be suspended, for example, only those that consume above a threshold amount of memory, processing or battery power.

Flowchart 700 concludes with step 706, in which execution of the at least one of the script or the resource accessed at the website upon detecting resumed activity on the open tab. To continue with the example embodiment from step 702, when web browser 308 or mitigation system 312 detects that the user has resumed interacting with the first tab, thereby re-activating it, web browser 308 or mitigation system 312 may resume execution of one or more script or resource that was suspended. The user interaction may be any form of user input, such as a mouse click on the suspended tab, a voice command to reactivate the suspended tab, etc.

Figure 8:
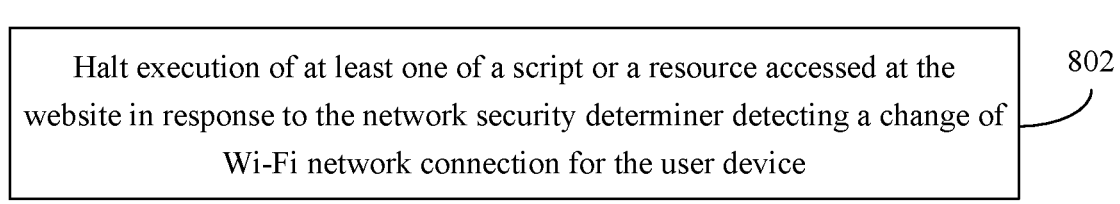

FIG. 8 depicts a flowchart 800 of another method for performing a mitigation action, according to an example embodiment. The method of flowchart 800 may be performed by computing device 300 of FIG. 3, although flowchart 800 is not limited to this embodiment. The method of flowchart 800 includes step 802, in which execution of at least one of a script or a resource accessed at the website is halted in response to the network security determiner detecting a change of Wi-Fi network connection for the user device. For example, network security determiner 314 may detect a change in the Wi-Fi network connection for computing device 300. In response, security manager 312 may automatically halt one or more scripts or resources accessed at a website rendered on a tab of web browser 308. When there is a change in Wi-Fi network connection, it is possible that computing device 300 is being moved from a private network to a public or unsecured Wi-Fi network, which may create a security vulnerability if all open tabs of web browser 308 are reloaded and all resources and scripts executed. For example, an unsecured website may not be as safe to browse over an open public Wi-Fi network as over a private Wi-Fi network. The user of computing device 300 may not remember all the web pages associated with all the open tabs, or whether those web pages are secure. Thus, the user may have to take great care of verify each open tab, remember their type of communication security or decide these burdens are too much and simply accept greater security risks. By automatically suspending all open tabs of web browser 308 upon detecting a Wi-Fi network change the security risks presented by unsecured websites and/or open Wi-Fi network are reduced or eliminated completely.

Figure 9:
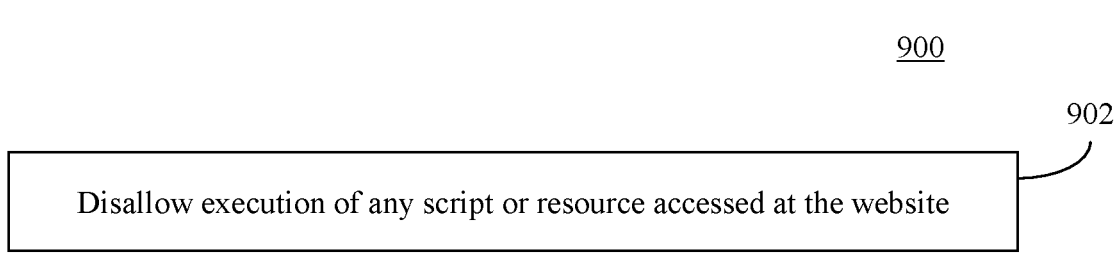

FIG. 9 depicts a flowchart 900 of yet another method for performing a mitigation action, according to an example embodiment. The method of flowchart 900 may be performed by computing device 300 of FIG. 3, although flowchart 900 is not limited to this embodiment. The method of flowchart 900 includes step 902, in which execution of any script or resource accessed at the website is disallowed. For example, security manager 312 may automatically disallow any scripts or resources associated with a website. In an example embodiment, scripts and resources are not allowed, especially when the type of communication of the website is unsecured and the network to which computing device 300 is connected is an open Wi-Fi network. In another example embodiment, web browser 308 may inform the user of computing device 300 that resources and scripts have been disabled. Web browser 308 may also present the user with an option to allow the resources and scripts on a case-by-case basis or by changing a global setting to allow certain resources or scripts for a type of communication of the website or a security mode of the Wi-Fi network.

The mitigation techniques described herein may be implemented with different applications, in addition to web browsers, to improve security for a computing device connected to a network. For example, FIG. 10 depicts a flowchart 1000 of a method for mitigating security risks associated with an open network, according to an example embodiment. Flowchart 1000 is similar to flowchart 200, and therefore details are not repeated here for the sake of brevity. Flowchart 1000 will be described with reference to system 100 of FIG. 1 and computing device 300 of FIG. 3. However, other structural and operational embodiments will be apparent to persons skilled in the relevant art(s) based on the following discussion regarding flowchart 1000.

As shown in FIG. 10, flowchart 1000 begins at step 1002, in which a security mode of a Wi-Fi network with which the user device is connected is determined. For example, and with reference to system 100 of FIG. 1, mitigation system 104 may determine the security mode of network 108 with which computing device 102 is connected. The security mode of network 108 may be an open mode or open public Wi-Fi or a private mode or private Wi-Fi. The methods for determining the security mode will be described in more detail below in reference to FIG. 11.

Flowchart 1000 continues with step 1004, in which an application attempting to transmit sensitive information over the Wi-Fi network is detected. For example, mitigation system 104 or mitigation system 312 (via security manager 318) may detect that an application is attempting to transmit sensitive information over the Wi-Fi network. Such an application may be any application or service that can communicate over the Wi-Fi network, and may therefore transmit data over the Wi-Fi network. Non-limiting examples of such an application include email clients, gaming applications, social networking applications, banking applications, etc.

Flowchart 1000 concludes with step 1006, in response to determining that the security mode is an open mode and detecting that the application is attempting to transmit sensitive information over the open Wi-Fi network, the transmission of the sensitive is prevented. For example, mitigation system 104 or mitigation system 312 (via security manager 318) may determine that the security mode of the Wi-Fi network is open mode and detect that an application is attempting to transmit sensitive information over the open Wi-Fi network. In response, mitigation system 104 or mitigation system 312 may prevent the transmission of the sensitive information.

The foregoing steps of flowchart 1000 may be performed in various ways. For example, FIG. 11 depicts a flowchart 1100 of an additional example method of determining a security mode of an open network, according to an example embodiment. Flowchart 1100 includes refinements or additions to the method steps of flowchart 1000 as depicted in FIG. 10. Thus, flowchart 1100 of FIG. 11 will also be described with continued reference to system 100 of FIG. 1 or computing device 300 of FIG. 3. However, other structural and operational embodiments will be apparent to persons skilled in the relevant art(s) based on the following discussion regarding flowchart 1100.

As shown in FIG. 11, the method of flowchart 1100 begins at step 1102, in which a security mode of a Wi-Fi network with which the user device is connected comprises one or more of several techniques shown in steps 1104, 1106 and 1108. Each of these steps be performed, for example, by network security determiner 314 of FIG. 3.

At step 1104, an operating system-level API is utilized to determine the security mode of the Wi-Fi network with which the user device is connected. In an example embodiment, network security determiner 314 may use an operating system-level API to determine the security mode of the Wi-Fi network (e.g., network 108 in FIG. 1) with which computing device 300 is connected. In an alternate example embodiment, the determination of the security mode of the Wi-Fi network may be made by operating system 306, and provided to other applications (e.g., mitigation system 312, web browser 308, or application 310) automatically or upon request. The security mode of the Wi-Fi network may be any of a private mode, a public mode or an open mode. The private mode may be more secure than the open mode. Some public Wi-Fi networks may include certain security measures (e.g., password protected). However, as referred to herein, the open mode public Wi-Fi network is a public Wi-Fi network that is not secure and does not require a password for access. In example embodiments, operating system 306 shown in FIG. 3 may include APIs, components, and services that support applications in networking. In an example embodiment, any API, service or component may be used to determine the security mode of the Wi-Fi network (e.g., network 108 in FIG. 1) with which computing device 300 is connected.

Flowchart 1100 continues at step 1106, in which hop counting is performed between the user device and another device. For example, hop counting may be performed between computing device 300 and a server (e.g., server 116 or server 122 shown in FIG. 1) that the application on computing device 300 is attempting to access. In an example embodiment, network security determiner 314 may use a networking program, an operating system tool or command (e.g., tracert) to perform hop counting. Hop count may be the total number of intermediate devices (e.g., routers, access points, or repeaters) through which a given piece of data or data packet passes along a path between two nodes, a source (e.g., computing device 102 shown in FIG. 1) and a destination (e.g., server 116 or server 122 shown in FIG. 1). From the hop counting operation, network security determiner 314 may determine whether the data packet is corrupted or should not be trusted, which may indicate that the currently connected network is not secure and mitigation actions may be needed.

At step 1108, a setting of the Wi-Fi network or a device thereof is determined. In an example embodiment, network security determiner 314 may determine the location of the Wi-Fi network or the Wi-Fi device or router by any means available, such as via operating system 306, by invoking a networking tool, command or API, querying or accessing the Wi-Fi device for its settings, or accessing the networking profile that is currently used. The settings of the Wi-Fi network or the Wi-Fi device or router may be configured by operating system 306 and/or the user of computing device 300. Thus, from the settings, the security mode of the Wi-Fi network may be determined. For example, the settings of the Wi-Fi device or router may indicate the security mode as open, WEP, WPA or WPA2, in order of increasing security. As another example, the location or name of the Wi-Fi network may be informative. A home or work location/name may be more private than a public location or a network having a name of a commercial entity. Accordingly, network security determiner 314 may determine whether the currently connected network is a trusted or secure network. For example, when the location for the Wi-Fi network is determined to be "public" and/or the security mode is "open" then network security determiner 314 may conclude that the Wi-Fi network is not secure and that mitigation measures are necessary. In contrast, if the security mode is WPA and/or the location is determined to be "home" or "work," mitigation measures may not be necessary because such networks may be secure.

In the context of an application, such as an email client, mitigation measures may also be performed when necessary. For example, FIG. 12 depicts a flowchart of a method of preventing transmission of sensitive information over an open network, according to an example embodiment. Flowchart 1200 includes refinements or additions to the method steps of flowchart 1000 as depicted in FIG. 10. Accordingly, flowchart 1200 will also be described with continued reference to system 100 of FIG. 1 or computing device 300 of FIG. 3. However, other structural and operational embodiments will be apparent to persons skilled in the relevant art(s) based on the following discussion regarding flowchart 1200.

Flowchart 1200 includes step 1202, in which the detection that an application is attempting to transmit sensitive information is performed by at least one of an operating system or the application of the user device. For example, mitigation system 312 of FIG. 3 may detect that an application (e.g., application 310) is attempting to transmit sensitive information when mitigation system 312 is a part of that application or as a standalone system separate from that application. In an example embodiment, mitigation system 104 may be implemented as part of the application. For example, if the application is an email client, mitigation system 104, being a part of the email client, may automatically prevent an email containing credit card information to be sent over the open-Wi-Fi network and may transmit the email when computing device 102 is connected to a private, secure network. In another example embodiment, mitigation system 312 may be implemented as a separate application. Accordingly, mitigation system 312 may determine that computing device 300 is connected to an open Wi-Fi network, and thus may monitor outbound data (e.g., a network stack) to determine whether there is a pending transmission of sensitive information over the open Wi-Fi network. When sensitive information is detected, mitigation system 312 may remove or divert any sensitive data packets from the outbound queue, and thus prevents sensitive information from being transmitted over the open Wi-Fi network. In yet another embodiment, operating system 306 may determine whether any outbound data includes sensitive information that pose a security risk if transmitted over the open Wi-Fi network. In this case, operating system 306 may inform mitigation system 312 of such pending transmission of sensitive information automatically or upon request.

III. Example Mobile Device and Computer System Implementation

Each of mitigation system 104, mitigation system 312, and flowcharts 200, and 400-1200 may be implemented in hardware, or hardware combined with software and/or firmware. For example, mitigation system 104, mitigation system 312, and flowcharts 200, and 400-1200 may be implemented as computer program code/instructions configured to be executed in one or more processors and stored in a computer readable storage medium. Alternatively, mitigation system 104, mitigation system 312, and flowcharts 200, and 400-1200 may be implemented as hardware logic/electrical circuitry.

For instance, in an embodiment, one or more, in any combination, of mitigation system 104, mitigation system 312, and flowcharts 200, and 400-1200 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

FIG. 13 is a block diagram of an exemplary mobile system 1300 that includes a mobile device 1302 that may implement embodiments described herein. For example, mobile device 1302 may be used to implement any system, client, or device, or components/subcomponents thereof, in the preceding sections. As shown in FIG. 13, mobile device 1302 includes a variety of optional hardware and software components. Any component in mobile device 1302 can communicate with any other component, although not all connections are shown for ease of illustration. Mobile device 1302 can be any of a variety of computing devices (e.g., cell phone, smart phone, handheld computer, Personal Digital Assistant (PDA), etc.) and can allow wireless two-way communications with one or more mobile communications networks 1304, such as a cellular or satellite network, or with a local area or wide area network.

Mobile device 1302 can include a controller or processor 1310 (e.g., signal processor, microprocessor, ASIC, or other control and processing logic circuitry) for performing such tasks as signal coding, data processing, input/output processing, power control, and/or other functions. An operating system 1312 can control the allocation and usage of the components of mobile device 1302 and provide support for one or more application programs 1314 (also referred to as "applications" or "apps"). Application programs 1314 may include common mobile computing applications (e.g., e-mail applications, calendars, contact managers, web browsers, messaging applications) and any other computing applications (e.g., word processing applications, mapping applications, media player applications).

Mobile device 1302 can include memory 1320. Memory 1320 can include non-removable memory 1322 and/or removable memory 1324. Non-removable memory 1322 can include RAM, ROM, flash memory, a hard disk, or other well-known memory devices or technologies. Removable memory 1324 can include flash memory or a Subscriber Identity Module (SIM) card, which is well known in GSM communication systems, or other well-known memory devices or technologies, such as "smart cards." Memory 1320 can be used for storing data and/or code for running operating system 1312 and application programs 1314. Example data can include web pages, text, images, sound files, video data, or other data to be sent to and/or received from one or more network servers or other devices via one or more wired or wireless networks. Memory 1320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1320. These programs include operating system 1312, one or more application programs 1314, and other program modules and program data. Examples of such application programs or program modules may include, for example, computer program logic (e.g., computer program code or instructions) for implementing one or more of including system 100 of FIG.

1, computing device 300 of FIG. 3, along with any components and/or subcomponents thereof, as well as the flowcharts/flow diagrams described herein, including portions thereof, and/or further examples described herein.

Mobile device 1302 can support one or more input devices 1330, such as a touch screen 1332, a microphone 1334, a camera 1336, a physical keyboard 1338 and/or a trackball 1340 and one or more output devices 1350, such as a speaker 1352 and a display 1354. Other possible output devices (not shown) can include piezoelectric or other haptic output devices. Some devices can serve more than one input/output function. For example, touch screen 1332 and display 1354 can be combined in a single input/output device. Input devices 1330 can include a Natural User Interface (NUI).

One or more wireless modems 1360 can be coupled to antenna(s) (not shown) and can support two-way communications between processor 1310 and external devices, as is well understood in the art. Modem 1360 is shown generically and can include a cellular modem 1366 for communicating with the mobile communication network 1304 and/or other radio-based modems (e.g., Bluetooth 1364 and/or Wi-Fi 1362). At least one wireless modem 1360 is typically configured for communication with one or more cellular networks, such as a GSM network for data and voice communications within a single cellular network, between cellular networks, or between the mobile device and a public switched telephone network (PSTN).

Mobile device 1302 can further include at least one input/output port 1380, a power supply 1382, a satellite navigation system receiver 1384, such as a Global Positioning System (GPS) receiver, an accelerometer 1386, and/or a physical connector 1390, which can be a USB port, IEEE 1394 (FireWire) port, and/or RS-232 port. The illustrated components of mobile device 1302 are not required or all-inclusive, as any components can be deleted and other components can be added as would be recognized by one skilled in the art.

In an embodiment, mobile device 1302 is configured to implement any of the above-described features of flowcharts herein. Computer program logic for performing any of the operations, steps, and/or functions described herein may be stored in memory 1320 and executed by processor 1310.

FIG. 14 depicts an exemplary implementation of a computing device 1400 in which embodiments may be implemented. For example, mitigation system 104 and mitigation system 312 may each be implemented in one or more computing devices similar to computing device 1400 in stationary or mobile computer embodiments, including one or more features of computing device 1400 and/or alternative features. The description of computing device 1400 provided herein is provided for purposes of illustration and is not intended to be limiting. Embodiments may be implemented in further types of computer systems, as would be known to persons skilled in the relevant art(s).

As shown in FIG. 14, computing device 1400 includes one or more processors, referred to as processor circuit 1402, a system memory 1404, and a bus 1406 that couples various system components including system memory 1404 to processor circuit 1402. Processor circuit 1402 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1402 may execute program code stored in a computer readable medium, such as program code of operating system 1430, application programs 1432, other programs 1434, etc. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computing device 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1430, one or more application programs 1432, other programs 1434, and program data 1436. Application programs 1432 or other programs 1434 may include, for example, computer program logic (e.g., computer program code or instructions) for implementing mitigation system 104, mitigation system 312, and flowcharts 200, and 400-1200 (including any suitable step of flowcharts 200, and 400-1200), and/or further embodiments described herein.

A user may enter commands and information into the computing device 1400 through input devices such as keyboard 1438 and pointing device 1440. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1402 through a serial port interface 1442 that is coupled to bus 1406, but may be connected by other interfaces, such as a parallel port, game port, or a universal serial bus (USB).

A display screen 1444 is also connected to bus 1406 via an interface, such as a video adapter 1446. Display screen 1444 may be external to, or incorporated in computing device 1400. Display screen 1444 may display information, as well as being a user interface for receiving user commands and/or other information (e.g., by touch, finger gestures, virtual keyboard, etc.). In addition to display screen 1444, computing device 1400 may include other peripheral output devices (not shown) such as speakers and printers.

Computing device 1400 is connected to a network 1448 (e.g., the Internet) through an adaptor or network interface 1450, a modem 1452, or other means for establishing communications over the network. Modem 1452, which may be internal or external, may be connected to bus 1406 via serial port interface 1442, as shown in FIG. 14, or may be connected to bus 1406 using another interface type, including a parallel interface.

As used herein, the terms "computer program medium," "computer-readable medium," and "computer-readable storage medium" are used to refer to physical hardware media such as the hard disk associated with hard disk drive 1414, removable magnetic disk 1418, removable optical disk 1422, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1432 and other programs 1434) may be stored on the hard disk, magnetic disk, optical disk, ROM, RAM, or other hardware storage medium. Such computer programs may also be received via network interface 1450, serial port interface 1442, or any other interface type. Such computer programs, when executed or loaded by an application, enable computing device 1400 to implement features of embodiments described herein. Accordingly, such computer programs represent controllers of the computing device 1400.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A computer-implemented method for mitigating risks associated with an unsecured communication with a website is described herein. The method includes: determining a security mode of a Wi-Fi network with which the user device is connected; determining a type of communication security for a website that a web browser of the user device is attempting to access over the Wi-Fi network; and in response to determining that the security mode is an open mode, and that the communication security type is unsecured, performing a mitigation action.

In one embodiment of the foregoing method, the determining a security mode of a Wi-Fi network with which the user device is connected comprises utilizing an operating system-level API to determine the security mode of Wi-Fi network with which the user device is connected.

In an additional embodiment of the foregoing method, the determining a security mode of a Wi-Fi network with which the user device is connected comprises performing hop counting.

In another embodiment of the foregoing method, the determining a security mode of a Wi-Fi network with which the user device is connected comprises determining a setting of the Wi-Fi network or a device thereof.

In another embodiment of the foregoing method, the performing a mitigation action comprises generating a visual warning indication in a graphical user interface for the web browser.

In yet another embodiment of the foregoing method, the performing a mitigation action comprises determining that the user device is attempting to transmit sensitive information across the open Wi-Fi network; generating an alert to notify a user that transmission of sensitive information is in progress; enabling the user to select at least one of allowing the transmission, denying the transmission, or rescheduling the transmission; and record data relating to any allowed transmission.

In still another embodiment of the foregoing method, the performing a mitigation action comprises determining that an open tab of the web browser that is connected to the website has been unused for a predetermined amount of time; halting execution of at least one of a script or a resource accessed at the website; and resuming execution of the at least one of the script or the resource accessed at the website upon detecting resumed activity on the open tab.

In an additional embodiment of the foregoing method, the performing a mitigation action comprises halting execution of at least one of a script or a resource accessed at the website in response to detecting a change of Wi-Fi network connection for the user device.

In an additional embodiment of the foregoing method, the performing a mitigation action comprises disallowing execution of any script or resource accessed at the website.

A system is described herein. In one embodiment, the system comprises: one or more processing circuits; and one or more memory devices connected to the one or more processing circuits, the one or more memory devices storing program code that is executable by the one or more processing circuits, the program code including: a network security determiner configured to determine a security mode of a Wi-Fi network with which a user device is connected; a website encryption determiner configured to determine a type of communication security for a website that a web browser of the user device is attempting to access over the Wi-Fi network; and a security manager configured to perform a mitigation action in response to determining that the security mode is an open mode and that the communication security type is unsecured.

In one embodiment of the foregoing system, wherein to determine a security mode of a Wi-Fi network, the network security determiner is configured to utilize an operating system-level API to determine the security mode of the Wi-Fi network with which the user device is connected; perform hop counting between the user device and the website; or determine a setting of the Wi-Fi network or a device thereof.

In another embodiment of the foregoing system, wherein to perform the mitigation action, the security manager is configured to generate a visual warning indication on the web browser; or determine that the user device is attempting to transmit sensitive information across the open Wi-Fi network, and generating an alert to notify a user that transmission of sensitive information is in progress.

In yet another embodiment of the foregoing system, wherein to perform the mitigation action, the security manager is configured to determine that an open tab of the web browser that is connected to the website has been unused for a predetermined amount of time; halt execution of at least one of a script or a resource accessed at the website; and resume execution of the at least one of the script or the resource accessed at the website upon detecting resumed activity on the open tab.

In yet another embodiment of the foregoing system, wherein to perform the mitigation action, the security manager is configured to halt execution of at least one of a script or a resource accessed at the website in response to the network security determiner detecting a change of Wi-Fi network connection for the user device.

In yet another embodiment of the foregoing system, wherein to perform the mitigation action, the security manager is configured to disallow execution of any script or resource accessed at the website.

Another computer-implemented method is described herein. The method includes: determining a security mode of a Wi-Fi network with which the user device is connected; detecting that an application is attempting to transmit sensitive information over the Wi-Fi network; and in response to determining that the security mode is an open mode and detecting that the application is attempting to transmit sensitive information over the open Wi-Fi network, preventing the transmission of the sensitive information.

In one embodiment of the foregoing method, the determining a security mode of a Wi-Fi network with which the user device is connected comprises at least one of utilizing an operating system-level API to determine the security mode of a Wi-Fi network with which the user device is connected; performing hop counting between the user device and another device; or determining a setting of the Wi-Fi network or a device thereof.

In another embodiment of the foregoing method, the detecting that an application is attempting to transmit sensitive information is performed by an operating system of the user device.

In another embodiment of the foregoing method, the detecting that an application is attempting to transmit sensitive information is performed by the application.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method in a user device for mitigating risks associated with an unsecured communication with a website, the method comprising:
   determining a first security mode of a Wi-Fi network with which the user device is connected;
   determining a type of communication security protocol for a website that a web browser of the user device is attempting to access over the Wi-Fi network;
   determining whether the first security mode of the Wi-Fi network has changed to a second security mode; and
   in response to determining that the first security mode of the Wi-Fi network has changed to the second security mode, and that the communication security protocol type is unsecured, halting execution of at least one of a script or a resource accessed at the website.

2. The method of claim 1, wherein said determining a first security mode of a Wi-Fi network with which the user device is connected comprises:
   utilizing an operating system-level application programming interface (API) to determine the first security mode of the Wi-Fi network with which the user device is connected.

3. The method of claim 1, wherein said determining a first security mode of a Wi-Fi network with which the user device is connected comprises:
   performing hop counting.

4. The method of claim 1, wherein said determining a first security mode of a Wi-Fi network with which the user device is connected comprises:
   determining a setting of the Wi-Fi network or a device thereof.

5. The method of claim 1, further comprising:
   generating a visual warning indication in a graphical user interface for the web browser.

6. The method of claim 1, further comprising:
   determining that the user device is attempting to transmit sensitive information across the Wi-Fi network while the Wi-Fi network is in the second security mode;
   generating an alert to notify a user that transmission of sensitive information is in progress;
   enabling the user to select at least one of allowing the transmission, denying the transmission, or rescheduling the transmission; and
   record data relating to any allowed transmission.

7. The method of claim 1, further comprising:
   disallowing execution of any script or resource accessed at the website.

8. The method of claim 1, wherein the second security mode is less secure than the first security mode.

9. A system, comprising:
   one or more processing circuits; and
   one or more memory devices connected to the one or more processing circuits, the one or more memory devices storing program code that is executable by the one or more processing circuits, the program code comprising:
   a network security determiner configured to:
      determine a first security mode of a Wi-Fi network with which a user device is connected; and
      determine whether the first security mode of the Wi-Fi network has changed to a second security mode;
   a website encryption determiner configured to determine a type of communication security protocol for a web site that a web browser of the user device is attempting to access over the Wi-Fi network; and
   a security manager configured to halt execution of at least one of a script or a resource accessed at the web site in response to detecting that the first security mode Wi-Fi network has changed to the second security mode and that the communication security protocol type is unsecured.

10. The system of claim 9, wherein to determine a first security mode of a Wi-Fi network with which the user device is connected, the network security determiner is configured to:
    utilize an operating system-level API to determine the first security mode of the Wi-Fi network with which the user device is connected;
    perform hop counting between the user device and the website; or determine a setting of the Wi-Fi network or a device thereof.

11. The system of claim 9, wherein the security manager is further configured to:
   generate a visual warning indication on the web browser; or
   determine that the user device is attempting to transmit sensitive information across the the Wi-Fi network while the Wi-Fi network is in the second security mode, and generating an alert to notify a user that transmission of sensitive information is in progress.

12. The system of claim 9, wherein the security manager is further configured to:
   disallow execution of any script or resource accessed at the website.

13. The system of claim 9, wherein determining the first security mode of the Wi-Fi network with which the user device is connected comprises:
   determining a hop count between a user device and a remote node accessed over a Wi-Fi network; and
   comparing the hop count to a pre-defined threshold.

14. The system of claim 9, wherein the second security mode is less secure than the first security mode.

15. A method, comprising:
   determining a hop count between a user device and a remote node accessed over a Wi-Fi network;
   determining a first security mode of the Wi-Fi network with which the user device is connected by comparing the hop count to a pre-defined threshold;
   detecting that an application is attempting to transmit sensitive information over the Wi-Fi network; and
   in response to determining that the first security mode of the Wi-Fi network is an unsecure mode and detecting that the application is attempting to transmit sensitive information over the open Wi-Fi network, preventing the transmission of the sensitive information.

16. The method of claim 15, wherein said detecting that an application is attempting to transmit sensitive information is performed by an operating system of the user device.

17. The method of claim 15, wherein said detecting that an application is attempting to transmit sensitive information is performed by the application.

18. The method of claim 15, further comprising:
   generating an alert to notify a user that transmission of sensitive information is in progress; and
   enabling the user to select at least one of allowing the transmission, denying the transmission, or rescheduling the transmission.

19. The method of claim 15, further comprising:
   determining whether the first security mode of the Wi-Fi network has changed to a second security mode; and
   in response to determining that the first security mode of the Wi-Fi network has changed to the second security mode, automatically placing the sensitive information into an outbound queue.

20. The method of claim 19, wherein the second security mode is more secure than the first security mode.

* * * * *